United States Patent [19]

Franchina

[11] 4,141,490
[45] Feb. 27, 1979

[54] HEATING SYSTEM

[76] Inventor: Antonino Franchina, 5219 Botsford St., Sterling Heights, Mich. 48077

[21] Appl. No.: 871,493

[22] Filed: Jan. 23, 1978

[51] Int. Cl.² .......................................... G05D 23/00
[52] U.S. Cl. ..................................... 237/2 B; 62/238; 62/324; 165/DIG. 2; 126/110 R
[58] Field of Search .................... 62/2, 324 D, 238 E; 237/2 B, 55; 126/110 R; 165/DIG. 2

[56] References Cited

U.S. PATENT DOCUMENTS

| | | | |
|---|---|---|---|
| 1,969,187 | 8/1934 | Schutt | 237/1 A |
| 2,562,748 | 7/1951 | Smith et al. | 62/324 D |
| 2,723,083 | 11/1955 | Bary | 237/2 B |
| 2,827,893 | 3/1958 | Ribando et al. | 237/19 |
| 3,777,508 | 12/1973 | Imabayashi et al. | 62/324 D |
| 3,844,233 | 10/1974 | Fishback | 122/20 |
| 3,996,998 | 12/1976 | Garst et al. | 165/12 |
| 4,012,920 | 3/1977 | Kirschbaum | 237/2 B |

Primary Examiner—Henry C. Yuen
Attorney, Agent, or Firm—Basile and Weintraub

[57] ABSTRACT

A heating system for a building having a conventional gas furnace which includes a combustion chamber for heating air passing from a cold-air return to a hot-air duct. The gas furnace includes an exhaust stack for exhausting hot gases from the combustion chamber externally of the building. The heating system includes a heat pump comprising a housing having a condenser for heating air passing thereby from the cold-air return to the hot-air duct. The heat pump also includes an evaporator located externally of the building for drawing heat from the atmosphere. The heating system includes a conduit connecting the exhaust stack to the evaporator such that exhaust gases from the gas furnace combustion chamber will be directed past the evaporator for permitting the recapture of lost heat for heating the building.

4 Claims, 1 Drawing Figure

U.S. Patent
Feb. 27, 1979
4,141,490
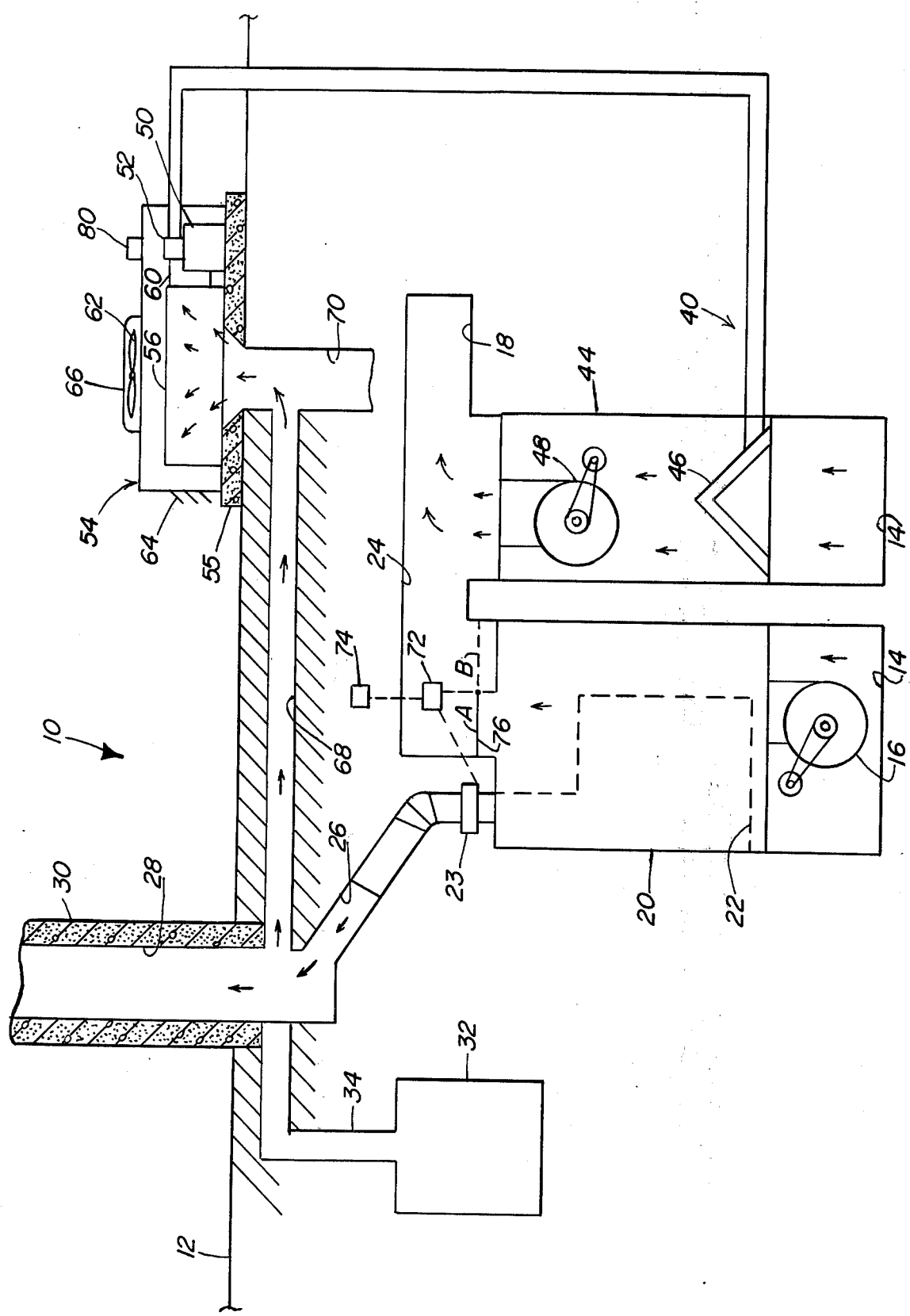

HEATING SYSTEM

BACKGROUND OF THE INVENTION

I. Field of the Invention

The present invention generally relates to heating devices and, in particular, the present invention is concerned with a heating system having a combined gas furnace and heat pump for providing heat to a building in an economical manner.

II. Description of the Prior Art

In recent years there has been a deep concern by the public for the high cost of energy and, in particular, the cost of providing heat to homes, office buildings and the like. A variety of methods have been proposed for drawing heat from the atmosphere, and heat pump cooling and air conditioning systems have been suggested as a solution. Such heat pump reversing or conversion systems have not yet met with full acceptance with the public in that they merely offer a different manner of heating rather than fulfilling their potentional as an additional heat source to be combined with heat generating systems of different types. Examples of heat pump conversion systems in the prior art are disclosed in U.S. Pat. Nos. 3,993,121; 3,996,998; 3,935,899; 3,777,508; 2,677,243; 3,844,233; and 4,050,628. These patents are relevant to applicant's invention in that they represent the closest prior art for utilizing heat pumps in conjunction with furnace systems to maximize the efficiency of obtaining heat for homes, office buildings and the like.

III. Prior Art Statement

The aforementioned prior art, in the opinion of the applicant and applicant's attorney, represents the closest prior art of which applicant and applicant's attorney are aware.

SUMMARY OF THE INVENTION

The present invention, which will be described in greater detail hereinafter, comprises a heating system for heating homes, office buildings and the like comprising a gas furnace connected between a cold-air return and a hot-air duct. The gas furnace includes a combustion chamber for heating air passing thereby from the cold-air return to the hot-air duct. An exhaust stack associated with the gas furnace exhausts the hot gases from the combustion chamber. The system has a heat pump comprising a condenser having an inlet communicating with the cold-air return and an outlet communicating with the hot-air duct. The heat pump has an evaporator located externally of the building for drawing heat from the atmosphere and communicating the same to the condenser to heat the air passing thereby. A conduit communicates the hot exhaust gases from the exhaust stack past the evaporator to provide a simple and efficient means for reclaiming heat lost from the gas furnace.

It is therefore a primary object of the present invention to provide a new and improved heating system.

It is a further object of the present invention to provide such a heating system which combines a gas furnace and a heat pump to provide an efficient system for heating and cooling the air within a building.

It is another object of the present invention to provide a heating system combining a gas furnace and a heat pump wherein the heat pump reversibly functions to heat and cool the supply of air delivered to the heating system.

It is yet a further object of the present invention to provide a combination heating system having a furnace and heat pump arrangement which results in substantial fuel savings as compared with conventional heating systems.

It is yet another object of the present invention to provide an improved heating system which may be readily and inexpensively installed.

Further objects, advantages and applications of the present invention will become apparent to those skilled in the art of heating systems when the accompanying description of one example of the best mode contemplated for practicing the invention is read in conjunction with the accompanying drawing.

BRIEF DESCRIPTION OF THE DRAWING

The sole drawing is a schematic diagram of a heating system constructed in accordance with the principles of the present invention.

DESCRIPTION OF THE PREFERRED EMBODIMENT

Referring now to the drawing, there is illustrated one example of the present invention in the form of a heating system 10. The system 10 is adapted to provide heat to the building 12 and includes a conventional forced-air system having a cold-air return 14 which includes a blower 16 used to circulate air through the forced-air system. The system also includes a hot-air duct 18, all of which functions in a conventional manner and needs no further description.

The heating system 10 includes a conventional gas furnace 20 having a combustion chamber 22 within which a fuel, such as gas, is ignited so as to heat the air passing from the cold-air return 14 to the hot-air duct 18 via connecting conduit 24. The gases from the combustion chamber 22 are exhausted from the gas furnace 20 and a flue lock 23 to a conventional metal conduit 26 for communication to the exhaust stack 28 of a chimney 30. It should be noted that the building 12 includes a gas hot-water tank 32 having a combustion chamber for heating hot water within the tank 32 and an exhaust conduit 34 which communicates the burnt gases from the hot-water tank 32 to the exhaust stack 28 of the chimney 30.

The heating system 10 further comprises a heat pump 40 which includes an interior portion or housing 44 that mounts a condenser 46 which, as will be described hereinafter, functions to heat air passing from the cold-air return 14 through the heat pump 40 such that the heated air may be communicated via a second blower 48 to the hot-air duct 18. The heat pump 40 includes a compressor 50 and a 4-way valve 52. The aforementioned components will be described in greater detail hereinafter. The heat pump 40 further comprises a housing 54 which is mounted externally of the building 12 on a concrete slab 55. The housing 54 mounts the compressor 50, the 4-way valve 52 and an evaporator 56 which communicates via suitable fluid conduits and the 4-way valve 52 with the compressor 50 and the condenser 46. The housing 54 further mounts a fan or blower element 62 which is adapted to draw air from the atmosphere through inlet 64 past the evaporator 56 whereupon the air is exhausted through outlet 66. The exhaust stack 28 communicates with an underground duct 68 which, in turn, communicates with the bottom of the external housing 54 such that hot gases from the exhaust stack 28 may be communicated directly to the evaporator 56 and then exhausted into the atmosphere via the exhaust 66. The hot-gas conduit 68 is connected to the evaporator via vertical conduit 70 which has a lower end connected to a suitable drain such that any water that may collect within the external heat pump housing 54 will be safely drained away.

The system 10, which will be described hereinafter, includes a variety of mechanical and electrical elements that are controlled by a control box 72 which, in turn, is actuated by a conventional thermostat 74.

The hot-air duct 18 includes a movable baffle 76. The baffle 76 is movable between two positions. The first position is the horizontal position "A" illustrated in the sole FIGURE. When the baffle 76 is rotated counterclockwise, as viewed in the drawing, to the position "A," it will engage the conduit 24 to close communication between the gas furnace 20 and the hot-air duct 18, whereby all of the air from the cold-air return 14 will be channeled through the heat pump 40 and to the hot-air duct 18 via the blower 48. In the same manner when the baffle 76 is rotated clockwise, as viewed in the sole FIGURE, to the position "B," the baffle 76 will disengage the outlet side of the furnace 20 whereby the air from the cold-air return 14 will pass through both the furnace 20 and the heat pump 40 and will be communicated to the hot-air duct 18 via conduit 24.

The heat pump 40 includes an external thermometer 80 which is adapted to sense outside temperature; and when the outside temperature drops below some predetermined level, such as 0 degrees F., the operation of the heat pump 40 will be turned off, as will be described hereinafter.

In use the system 10 is actuated by means of a 3-position thermostat 74 mounted within the usable portion of the building 12. The thermostat 74 is of a conventional type and may be purchased from a variety of suppliers, such as the Honeywell Corporation of Minneapolis, Minnesota. The thermostat 74 includes several thermostat elements which are adapted to actuate the blower 48 and turn on the heat pump 40 when the temperature in the building drops below a first predetermined level. When this occurs, the baffle 76 is rotated counterclockwise to the position "A" to close off communication with the furnace 20 such that the air from the cold-air return 14 travels through the heat pump 40 to the hot-air duct 18 via blower 48. At this time the heat pump 40 is activated such that the fluid heat transfer medium, such as Freon, in the heat pump 40 is evaporated at low pressure in the evaporator 56. The heat for this is drawn from the atmosphere due to the fan 62 drawing air from the outside through the vent 64 past the evaporator 56 prior to exhausting the air back into the atmosphere via vent 66. The work of transporting the Freon from low pressure to high pressure is done by the compressor 50. Thus, the Freon passes through a conduit 60, the 4-way valve 52, to compressor 50, and thereupon is directed to the condenser 46. The compresser 50 draws vapors from the conduit 60 and compresses it to a desired higher pressure. In the condenser 46 the vapor is condensed at that higher pressure and gives off heat in so doing. The air passing by the condenser 46 is heated by the condenser 46. The air is then communicated via blower 48 to the hot-air duct 18 for distribution throughout the building 12. This arrangement of obtaining heat from the atmosphere should function at acceptable levels to provide heat for the building 12 until the temperature outside drops below some predetermined degree, say 32 degree. F. At this point there may not be sufficient heat in the atmosphere for the heat pump to work. Accordingly, heat will not be provided to the interior of the building 12 and a second thermostatic element within the thermostat 74 will be responsive to the continued drop in temperature within the building 12 so as to activate the gas furnace 20 and the blower 16 in the conventional manner. The flue lock 23 is opened and baffle 76 is then shifted to position "B" so as to permit the passage of air through both the furnace 20 and the heat pump 40. The air that is passing through the furnace 20 and past the combustion chamber 22 will be heated thereby and communicated to the hot-air duct 18 via the conduit 24. At the same time the hot gases from the combustion chamber 22 will be communicated to the exhaust stack 28; and due to the vacuum effect generated by the rotating fan 62, the hot gases being exhausted through the conduit 26 into the exhaust stack 28 will be communicated to the conduits 68 and 70 and will pass over the evaporator 56. The heat from the hot gases exhausted from the furnace 20 and the hot-water heater 32 will provide the necessary heat for the heat pump 40 to function. The heat passing over the evaporator 56 will be absorbed thereby and transferred to the condenser 46 in the aforementioned manner, whereupon the air which passes through the heat pump 40 will be heated and communicated to the hot-air duct 18. In certain applications it may be desired that when the gas furnace 20 becomes active, suitable mechanical means connected to the vent 64 will function to close the same so as to provide a strong suction for drawing hot gases from the exhaust stack 28 and communicating the gases to the evaporator via the hot-gas conduits 68 and 70.

When the outside temperature drops below some second predetermined value, say 0 degrees F., the same will be sensed by the thermostat 80 and the heat pump 40 will be turned off, whereupon heat for the building will be provided solely by means of the furnace 20. In this mode the baffle 76 remains in the position "B" and the air passes from the cold-air return 14 through the furnace 20 for communication via conduit 24 to the hot-air duct 18. While each system will have to be experimented with individually to determine the appropriate temperature at which the system should be turned off, it is believed that it is a point at which the temperature is so low that it is simply too inefficient to operate the heat pump.

It should be noted that the heat pump works in the conventional manner in the summertime to provide cooling of the building 12. In the cooling mode the baffle 76 is shifted counterclockwise to the position "A" so as to close off the furnace 20, while the valve 52 functions to direct the flow of the fluid from the condenser 46 to the compressor 50 and onto the evaporator 56. In this mode the condenser 46 functions as an evaporator and the evaporator 56 functions as a condenser, thereby drawing heat from the air passing by the condenser 46, and that heat is exhausted to the atmosphere via the vent 66.

It can thus be seen that the present invention has provided a new and improved system for heating buildings and the like wherein a heat pump is used in combination with a gas furnace in such a manner that the system is very economical in that it reclaims the heat which is lost from gas furnaces.

It should be understood by those skilled in the art of heating systems that other forms of applicant's invention may be had, all coming within the spirit of the invention and scope of the appended claims.

What is claimed is as follows:

1. A heating system for a building comprising:
   a hot-air duct;
   a cold-air return;
   a gas furnace having an inlet communicating with said cold-air return and an outlet communicating with said hot-air duct, said furnace having a combustion chamber for heating the air passing thereby from said cold-air return to said hot-air duct;
   an exhaust stack for exhausting the hot gases from said combustion chamber;
   a heat pump comprising a condenser with an inlet communicating with said cold-air return and an outlet communicating with said hot-air duct, said condenser heating the air passing thereby from said cold-air return to said hot-air duct, said heat pump having an evaporator located externally of said building for drawing heat from the air passing thereby;
   a fan for passing air by said evaporator; and
   conduit means communicating the heat stack to said evaporator so that heat from the heat exhausted by said furnace may be drawn from the air via said evaporator and utilized to provide heat for said building, said furnace and said heat pump respectively communicate said cold-air return to said hot-air duct, said hot-air duct having baffle means movable from a first position permitting communication of said furnace and said heat pump with said hot-air duct, to a second position wherein said baffle permits communication from said furnace to said hot-air duct while permitting communication of air through said heat pump to said hot-air duct.

2. The heating system defined in claim 1, wherein said evaporator is mounted within an enclosed housing externally of said building, said housing having movable baffles for permitting the passage of air thereby, said baffles being closable such that said fan creates a suction for drawing air from said heating stack via said conduit.

3. The heating system defined in claim 1 comprising a thermostat being responsive to a first predetermined temperature for activating said heat pump, said thermostat being operative in response to a second lower temperature for activating said gas furnace.

4. The heating system defined in claim 2 further comprising a thermostat mounted externally of said housing and adapted to terminate operation of said heat pump when the temperature outside said building drops below a predetermined amount.

* * * * *